United States Patent
Grossardt et al.

[11] Patent Number: 5,482,363
[45] Date of Patent: Jan. 9, 1996

[54] ANTI-LOCK BRAKE SYSTEM

[75] Inventors: Bernd Grossardt, Bönnigheim, Germany; Frank Sager, Farmington Hills, Mich.

[73] Assignee: Robert Bosch GmbH, Stuttgart, Germany

[21] Appl. No.: 328,706

[22] Filed: Oct. 25, 1994

[30] Foreign Application Priority Data

Nov. 19, 1993 [DE] Germany .................. 43 39 571.6

[51] Int. Cl.⁶ ................................................ B60T 8/32
[52] U.S. Cl. ........................................ 303/173; 303/171
[58] Field of Search .............................. 303/92, 93, 100, 303/102, 103, 110, 9.61, 171, 173, 195; 364/426.02

[56] References Cited

U.S. PATENT DOCUMENTS

| | | | |
|---|---|---|---|
| 4,648,662 | 3/1987 | Fennel et al. ............................. | 303/92 |
| 4,969,101 | 11/1990 | Matsuda ............................... | 303/103 X |
| 4,989,923 | 2/1991 | Lee et al. ............................... | 303/92 X |
| 5,184,876 | 2/1993 | Beyer et al. ............................ | 303/106 |
| 5,262,951 | 11/1993 | Beyer et al. ........................ | 364/726.02 |
| 5,272,634 | 12/1993 | Leibbrand et al. ................. | 364/426.02 |
| 5,332,299 | 7/1994 | Schäfer ..................................... | 303/94 |

FOREIGN PATENT DOCUMENTS 9207744  5/1992  WIPO .

Primary Examiner—Josie Ballato
Attorney, Agent, or Firm—Felfe & Lynch

[57] ABSTRACT

In order to avoid faults as a result of different diameters of tires, under prescribed conditions a correction of one wheel speed with respect to the other on each side of the vehicle is performed. The conditions are based on a comparison of the throttle valve angle to the zero torque angle, and a comparison of the speed of the driven wheel to the speed of the non-driven wheel.

2 Claims, 2 Drawing Sheets

ANTI-LOCK BRAKE SYSTEM

PRIOR ART

The invention relates to an anti-lock brake system wherein slip signals are generated from wheel speed signals and a vehicle reference speed which approximates the vehicle speed. The slip signals in turn are used to generate control signals for brake pressure control valves. Such a system is known from Bosch Technische Berichte (Bosch Technical Reports) 7 (1980), issue 2, pp. 65 to 92, in particular pp. 79 to 83. For example, FIGS. 21 to 23 on pages 80 and 81 show the variation of the vehicle speed, a wheel speed and the reference speed. It is apparent that before the control begins the wheel speed is equal to the vehicle speed and this is equal to the reference speed. From the start of the control, the reference speed remains below the vehicle speed.

If all the wheels are included in the formation of the reference speed, in each case the fastest or second-fastest wheel raising the reference speed, and if a failure of a brake circuit occurs, the unbraked wheels raise the reference speed to the vehicle speed. The controller however is configured in such a way that the reference speed lies at the optimumpoint of the friction value/slip characteristic curve. However, if the reference speed depends on the speeds of wheels which are unbraked as a result of the circuit failure, the maximum possible vehicle deceleration is not achieved.

During ABS control of any wheel, the wheel speed signals of the wheels which are not subject to ABS control are excluded from formation of the reference speed signal.

SUMMARY OF THE INVENTION

The measure according to the invention permits, with a minimum degree of outlay, achieving in the case of circuit failure the maximum possible deceleration which can still be achieved.

DETAILED DESCRIPTION OF THE PREFERRED EMBODIMENT

Figure 1:
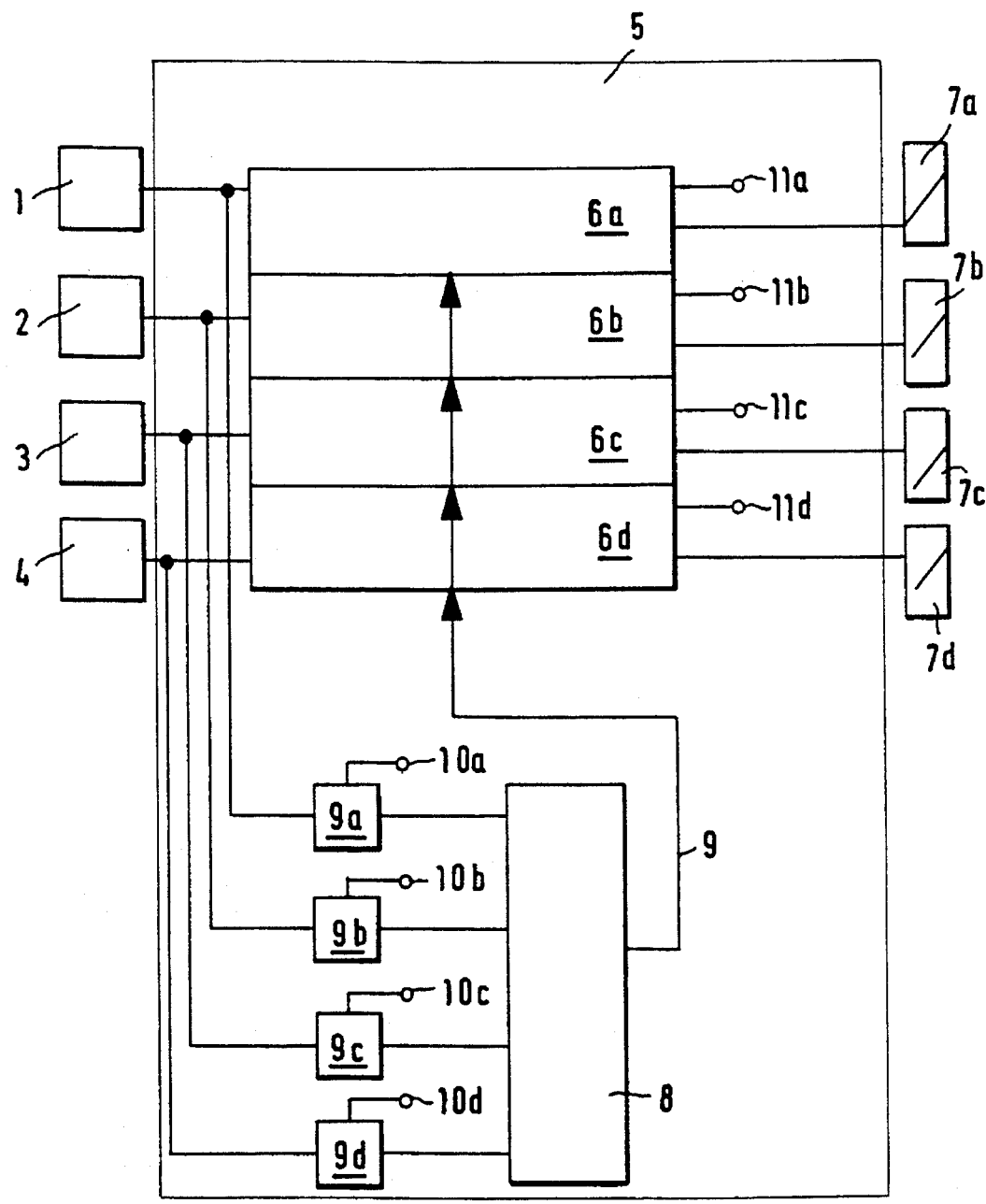
FIG. 1 is a circuit diagram of the brake system according to an embodiment of the invention.

The rpm sensors of the wheels of the vehicle are designated by 1 to 4. The speed signals output by these sensors are fed to an evaluation circuit 5 which has four control channels 6a to 6d for the individual wheels. The brake pressure control signals formed in the control channels 6a to 6d are then fed to brake pressure control valves 7a to 7d assigned to the wheels for varying the brake pressure. In the brake pressure control channels 6a to 6d, instability signals are formed which are compared with thresholds. When a threshold is exceeded, a brake pressure reduction is initiated. In the instability signal, wheel slip signals with wheel deceleration signals and associated signals (e.g. integral wheel slip) and vehicle deceleration signals can be intermingled.

It is essential for the invention that wheel slip signals are formed in the channels 6a to 6d. For this purpose, a reference speed is required which is formed in a known manner in a block 8 from the wheel speed signals of the sensors 1 to 4.

The reference speed obtained is fed via a line 9 to the channels 6a to 6d for slip formation.

Gates 9a to 9d which are normally conductive like closed switches are connected into the feedlines of the sensors 1 to 4 to the reference formation block 8. These gates 9 are provided with drive terminals 10a to 10d (which open the switches). On the other hand, the channels 6a to 6d have output terminals 11a to 11d at which a signal is present when the associated channel is reducing brake slippage (outlet valve open).

Figure 2:
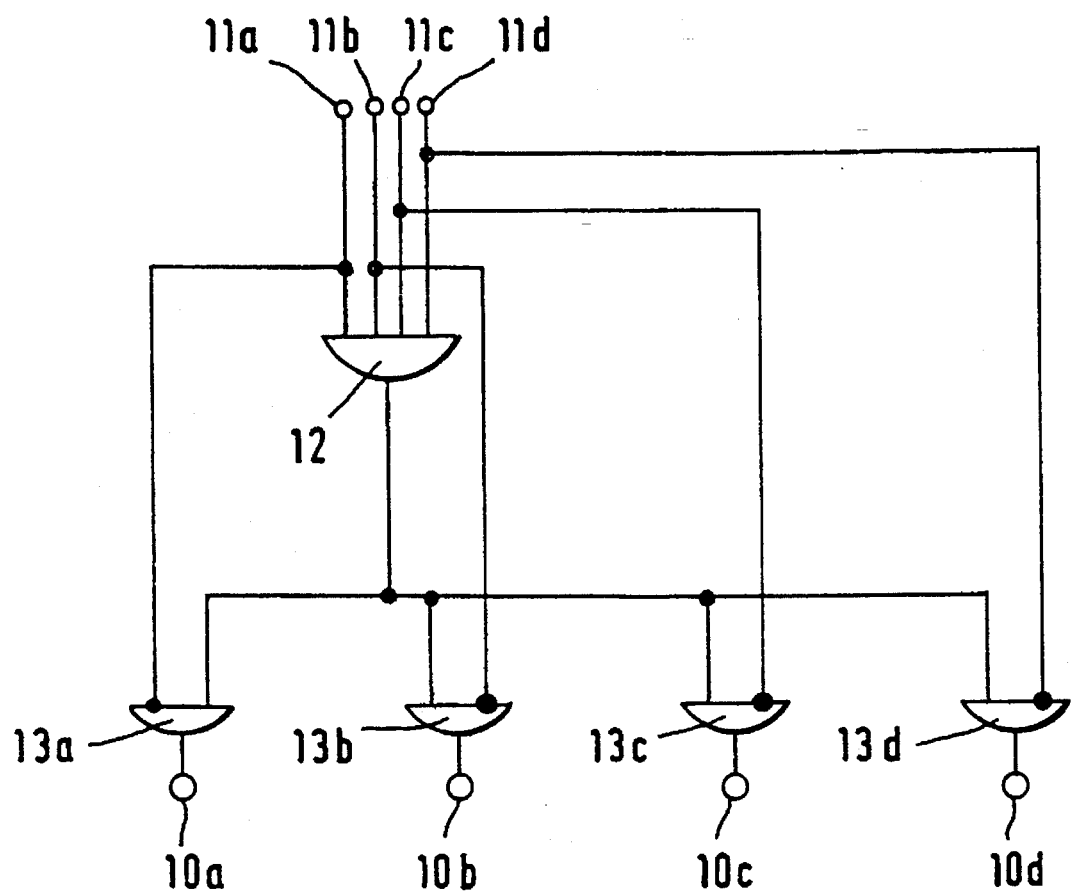
FIG. 2 is a diagram of a system portion which is integrated into the circuit of FIG. 1.

The circuit in FIG. 2 is connected in between the terminals 10a to 10d and the terminals 11a to 11d. The effect of the said circuit will be explained for the connection between the terminal 11a and the terminal 10a. The effect is analogous for the other terminals.

All the terminals 11a to 11d are connected to an OR gate 12 which outputs a signal when signal is present at at least one of the terminals 11a to 11d, that is to say at least one channel is operating in a controlling fashion. The output signal of the OR gate 12 is transmitted to AND gates 13a to 13d. The terminals 11a to 11d are connected to in each case one of the AND gates 13a to 13d via an inversion. This connection means that when one of the channels 6b to 6d is operating in a controlling fashion, but not the channel 6a, the AND gate 13a is conductive and makes the gate 9a non-conductive with its output signal. The same applies for the other channels. This means that in each case the wheel speeds of which the associated channel is not controlling are excluded from the reference variable formation when control is taking place in at least one channel. When a brake circuit fails, the wheel speeds of the wheels which are assigned to the brake circuit are excluded from the reference formation.

We claim:

1. Method for controlling brake pressure in a vehicle having wheels and brake pressure control devices at said wheels, said method comprising determining the speeds of the wheels and generating respective wheel speed signals, forming a reference speed signal based on at least one wheel speed signal;

generating slip signals based on the wheel speed signals and said references speed signal, producing brake pressure control signals based on said slip signals, varying brake pressure at at least one said wheel by feeding said brake pressure control signals to said brake pressure control device at said at least one wheel, and excluding wheel speed signals of wheels to which no control signals are fed from formation of said reference speed signal during varying of brake pressure at said at least one wheel.

2. Apparatus for controlling brake pressure in a vehicle having wheels and brake pressure control devices at said wheels, said apparatus comprising means for determining the speeds of the wheels and generating respective wheel speed signals, means for forming a reference speed signal based on at least one wheel speed signal, means for generating slip signals based on the wheel speed signals and said reference speed signal;

means for producing brake pressure control signals based on said slip signals, means for varying brake pressure at at least one said wheel by feeding said brake pressure control signals to said brake pressure control device at said at least one wheel, and means for excluding wheel speed signals of wheels to which no control signals are fed from formation of said reference speed signal during varying of brake pressure at said at least one wheel.

* * * * *